United States Patent [19]

Klasell et al.

[11] Patent Number: 5,439,749
[45] Date of Patent: Aug. 8, 1995

[54] COMPOSITE WOOD STRUCTURE

[75] Inventors: Thomas A. Klasell, Rice Lake; Leland R. Miller, Oconomowoc, both of Wis.

[73] Assignee: Andersen Corporation, Bayport, Minn.

[21] Appl. No.: 292,390

[22] Filed: Aug. 18, 1994

[51] Int. Cl.[6] .............................................. B32B 9/00
[52] U.S. Cl. .................................. 428/537.1; 428/44; 428/50; 428/68; 428/106; 428/114; 428/172; 428/192; 428/218; 428/414; 428/438; 428/475.5; 52/455; 52/409
[58] Field of Search ................. 428/192, 44, 45, 50, 428/106, 537.1, 219, 520, 218, 172, 438, 414, 511, 475.5; 52/302, 455

[56] References Cited

U.S. PATENT DOCUMENTS

| | | |
|---|---|---|
| 619,676 | 2/1899 | Cronin . |
| 682,321 | 9/1901 | Cronin . |
| 749,511 | 1/1904 | Anderson et al. . |
| 1,387,011 | 8/1921 | Ratcliff . |
| 1,448,180 | 5/1923 | Atwood et al. . |
| 2,532,130 | 11/1950 | Turner ................................ 20/56.4 |
| 2,609,896 | 9/1952 | Potchen ................................ 189/76 |
| 3,424,647 | 12/1903 | Callahan ............................... 161/205 |
| 3,667,179 | 6/1972 | Eisenberg .............................. 52/302 |
| 4,146,662 | 3/1979 | Eggers et al. ........................... 428/68 |
| 4,336,294 | 6/1982 | Meier .................................. 428/192 |
| 4,543,284 | 9/1985 | Baum .................................. 428/106 |
| 4,558,875 | 12/1985 | Yamaji et al. ......................... 277/227 |
| 4,569,873 | 2/1986 | Robbins ............................... 428/106 |
| 4,583,342 | 4/1986 | Lier ..................................... 52/714 |
| 4,743,484 | 5/1988 | Robbins ............................... 428/106 |
| 4,825,615 | 2/1989 | Turner ................................. 52/455 |
| 4,844,763 | 7/1989 | Robbins ............................... 156/269 |
| 4,848,053 | 7/1989 | Clausen ................................ 52/397 |
| 4,931,124 | 6/1990 | Baum .................................. 156/245 |
| 5,071,688 | 12/1991 | Hoffman .............................. 428/106 |
| 5,074,092 | 12/1991 | Norlander ............................. 52/455 |
| 5,225,264 | 7/1993 | Kato et al. ............................ 428/137 |
| 5,234,747 | 8/1993 | Walser ................................. 428/215 |

*Primary Examiner*—Patrick J. Ryan
*Assistant Examiner*—Abraham Bahta
*Attorney, Agent, or Firm*—Merchant, Gould, Smith, Edell, Welter & Schmidt

[57] ABSTRACT

Disclosed is a composite wood structure including (a) first and second spaced layers, and (b) a core interposed between the layers. A sheet-like vapor barrier is between the layers and limits migration of moisture through the barrier to less than about 6 grams per square meter of barrier area per hour. The wood structure is thereby made warp-resistant. In another embodiment, the structure has a vapor barrier on an outer surface and may have one or more additional vapor barriers between structure layers. Preferred vapor barrier materials include melamine formaldehyde impregnated paper, phenol formaldehyde impregnated paper, thermoset materials, thermoplastic materials and aluminum foil.

16 Claims, 5 Drawing Sheets

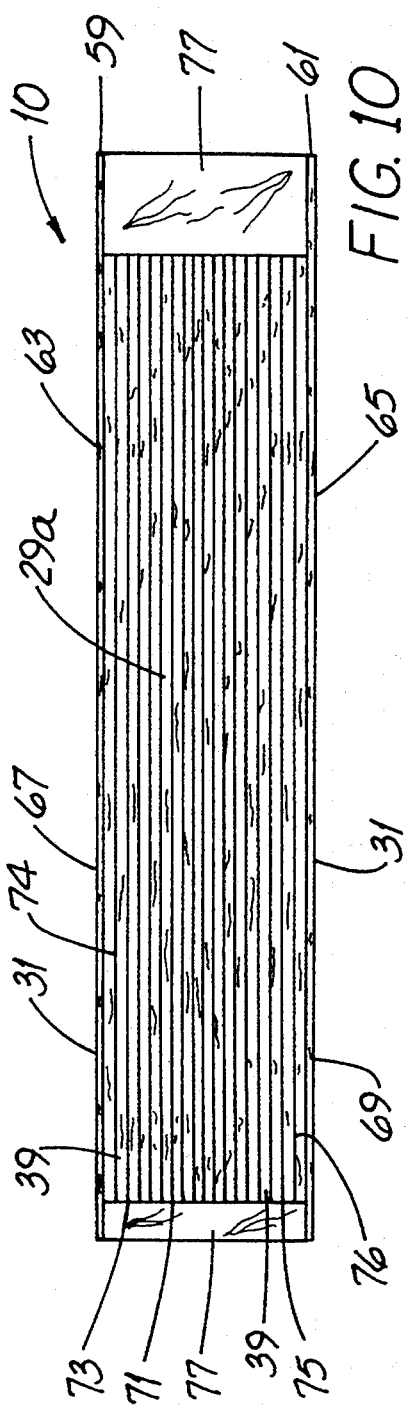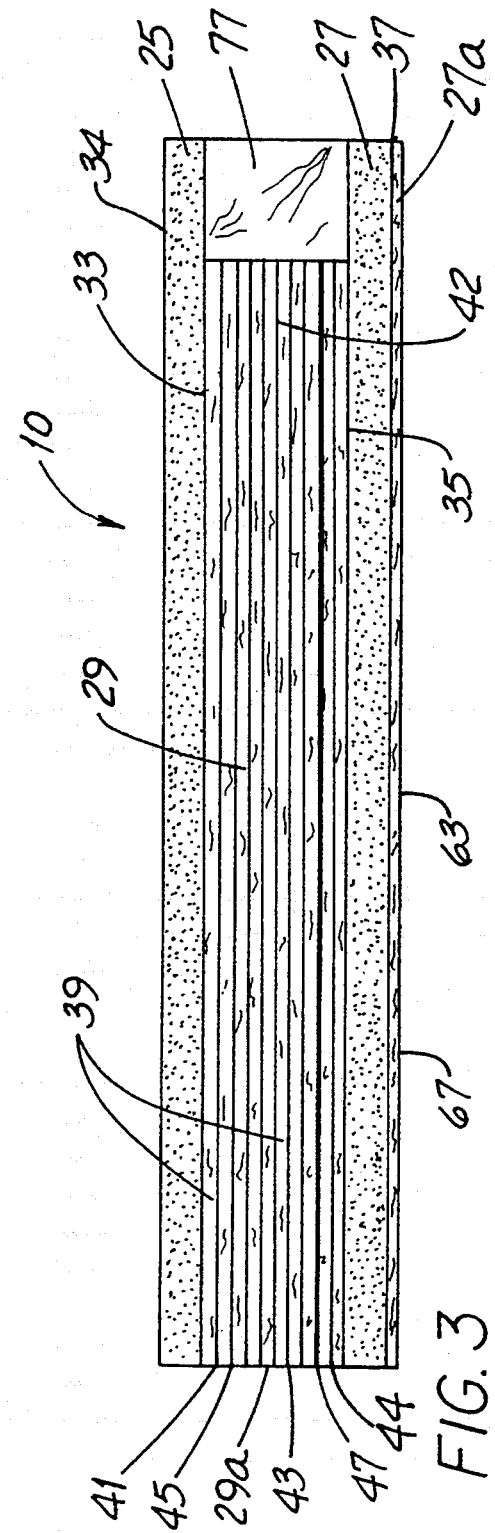

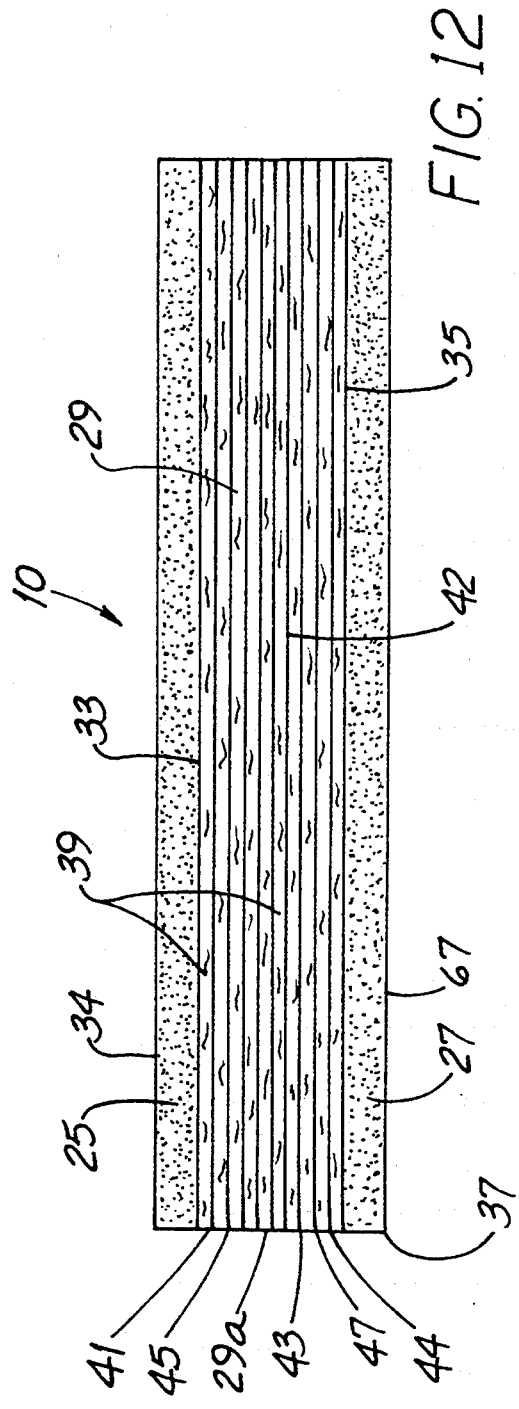
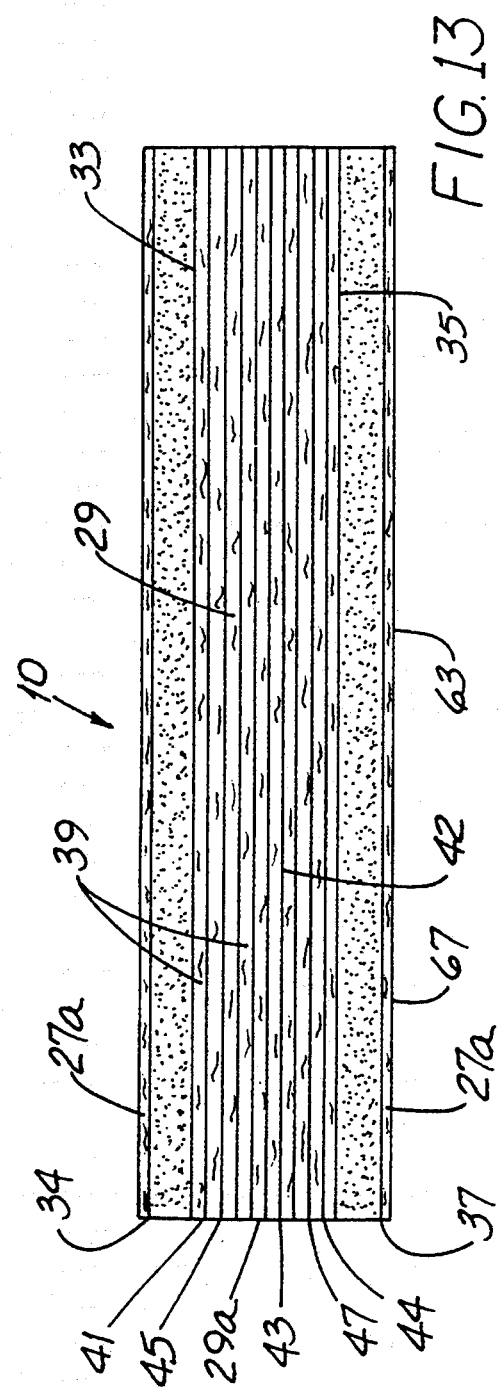

COMPOSITE WOOD STRUCTURE

FIELD OF THE INVENTION

This invention is related generally to static structures such as buildings and, more particularly, to stock materials used to make doors and windows for such structures.

BACKGROUND OF THE INVENTION

For at least decades and perhaps centuries, wood has been the preferred material for making doors and windows. When making, for example, a door having window panes, the horizontal top and bottom door structural portions (called "rails") and the vertical left and right door structural portions (called "stiles"), were often made of homogeneous unlaminated lumber.

With the diminution of stands of finer timber and with the advent of improved bonding techniques, manufacturers and builders have turned at least in part to so-called composite wood structures for rails and stiles. And it is believed that vinyl-clad composite wood structures are being used for window frames.

Composite wood structures are not made of homogeneous lumber. Rather, such structures often include planar layers of relatively thin strips of wood bonded together. Such layers, hidden from view in the finished product, may be cut from lesser-grade lumber. Examples of such a layered product are depicted in U.S. Pat. Nos. 5,071,688 (Hoffman); 4,743,484 (Robbins) and 5,234,747 (Walser et al.). Products depicted in the latter two patents are often referred to as "laminated veneer lumber" or simply "LVL." LVL is usually made of thin veneer-like planar portions or sheets oriented with their grains parallel and bonded together.

And wood strips are not the only material used to make door rails and stiles. Composite particle board (or simply composite board), often of the high density type, may be bonded to either side of an LVL core. The resulting "intermediate" product is used by door manufacturers in making rails and stiles for doors. And a decorative wood veneer may be bonded to one of the high-density layers. For aesthetic reasons, such veneer is intended to be on the interior side of the door and has applied thereto the finish coat of stain, varnish, paint or the like which is visible from the interior of the building. And veneer may be used on the exterior side of the door for the same purpose.

U.S. Pat. Nos. 1,387,011 (Ratcliff); 1,448,180 (Atwood et al.); 4,543,284 (Baum) and 5,225,264 (Kato et al.) all depict examples of efforts, not necessarily useful in making doors and windows, to "waterproof" wood structures. The Ratcliff and Atwood et al. patents involve multilayer structures including wire mesh. Such structures are wholly unacceptable for making doors and windows, at least because wire mesh damages wood cutting tools.

U.S. Pat. No. 4,146,662 (Eggers et al.) depicts a door having a solid particle board core with its exterior surfaces covered with a phenolic resin-impregnated overlay paper. The resulting door is said to have twice the warp resistance of standard wood doors.

While doors of the types described above have been generally satisfactory for their intended purposes, they are distinctly unsatisfactory in certain circumstances. So-called "weather doors," those having one side of the door exposed to the outdoor ambient, are often subjected to temperature and humidity conditions on one side which are disparate from those on the other. Moisture migration results and such migration is usually attended by warpage of some degree.

Understanding the phenomenon of warpage due to moisture migration will also be aided by the following. When composite wood structures are made into doors, the normal moisture content of the wood is on the order of 6-12%. Such moisture content is relatively evenly distributed through the thickness of the door. Moisture swells wood fibers but since such moisture is evenly distributed, such swelling is substantially uniform and little if any warpage occurs. However, if a significant moisture "gradient" develops across the thickness of the door, serious warpage may result.

In geographical areas having extremes of temperature and humidity like those found in the arid southwest of the United States, e.g., very hot and dry on the outside and, because of air conditioning or evaporative cooling, cool and moist on the inside, often cause a door to warp beyond acceptable limits. This is so since the moisture gradient across the thickness of the door may range from, say, 4% on one side to, say, 14% on the other side, a gradient of about 10%.

Door lower rails seem particularly susceptible to such warpage, perhaps because they are not well protected by roof overhang and are in the direct rays of the sun. And in larger doors, e.g., 8 foot doors, stile warpage can be a significant problem, as well.

Warpage above about 0.100 inches over the width of a door which is nominally 4 feet wide is often considered excessive and unacceptable by door manufacturers. For a sliding "glider" or patio door, excessive warpage manifests itself in a door which will not slide freely, if at all. And excessive warpage in a vertically-hinged door can cause such door to fail to seal or be difficult or impossible to close or open.

A composite wood structure which is effective in reducing door and window warpage to acceptable limits, even under interior/exterior extremes of temperature and humidity, would be an important advance in the art.

OBJECTS OF THE INVENTION

It is an object of this invention to provide an improved composite wood structure overcoming some of the problems and shortcomings of wood structures of the prior art.

Another object of this invention is to provide an improved composite wood structure which is useful in making doors and windows.

Another object of this invention is to provide an improved composite wood structure which reduces moisture migration to acceptable limits.

Another object of this invention is to provide an improved composite wood structure which reduces door and window warpage to acceptable limits.

Another object of this invention is to provide an improved composite wood structure which can be fabricated using conventional tools used by manufacturers to make doors and windows. How these and other important objects are accomplished will be apparent from the following descriptions and from the drawing.

SUMMARY OF THE INVENTION

The invention involves a composite wood structure that has (a) first and second spaced layers, and (b) a core interposed between the layers. The layers may be, for example, decorative veneer and/or high density particle board while the core may be LVL or other core materials described below.

In the improvement, a sheet-like vapor barrier is between the layers and limits migration of moisture through the barrier to less than about 6 grams. More preferably, migration is limited to about 5 grams and most preferably to about 1–2 grams or less, all per square meter of barrier area per hour. The resulting wood structure is made resistant to warp due to moisture migration. For example, such structure embodied as a piece about 4 feet long and useful to make a door rail exhibits warpage not in excess of about 0.100 inches. (In this specification, the term "sheet-like" means a vapor barrier applied as a thin sheet of flexible material and also means a vapor barrier applied in liquid or molten form to constitute a film-like barrier.)

In one embodiment, the layers are composite board and the vapor barrier is between the composite boards and the core. And even better resistance to moisture migration is provided with plural spaced vapor barriers between the layers.

In another embodiment, the core is laminated veneer lumber having a plurality of planar portions and the vapor barrier is between the planar portions. In a variation of such embodiment, the structure has plural spaced vapor barriers between the planar portions.

In yet another embodiment, the first layer is decorative veneer and a vapor barrier is between the veneer and the core. And where the core is laminated veneer lumber made of planar strip portions, either one vapor barrier is between the planar portions or plural spaced vapor barriers are between such portions.

While a core of LVL is preferred in many instances, the core of the inventive structure is not limited to such materials. Such core may be made of a material selected from a group of core materials comprising, in addition to laminated veneer lumber, (a) edge-glued finger jointed lumber, (b) laminated lumber, (c) plywood, (d) oriented strand board, (e) waferboard, (f) fiberboard, and (g) particle board. It is to be appreciated that like laminated veneer lumber, edge-glued finger jointed lumber, laminated lumber, plywood, oriented strand board, waferboard, fiberboard and particle board are all known per se.

The vapor barrier used in the inventive structure is made of a material selected from a group of vapor barrier materials comprising (a) melamine formaldehyde impregnated paper, (b) phenol formaldehyde impregnated paper, (c) thermoset materials, (d) thermoplastic materials and (e) aluminum foil. Examples of thermoset materials are polyester and polyurethane and examples of thermoplastic materials are polyethylene, polypropylene, polyvinylidine chloride, polyvinyl chloride and polycarbonate.

The foregoing composite wood structures involve one or more "between-layer" vapor barriers. However, that is not the only arrangement of the inventive structure effective in inhibiting moisture migration and, thus, warpage.

The invention may be embodied as a composite wood structure including (a) first and second spaced layers having first and second outer surfaces, respectively, and (b) a core interposed between the layers. A vapor barrier is on the first outer surface and limits migration of moisture through the barrier to less than about 6 grams of water vapor per square meter of barrier area per hour and most preferably to about 1–2 grams (or less) per square meter of barrier area per hour. The wood structure is thereby made resistant to warp due to moisture migration. Optionally, a vapor barrier is also on the second outer surface.

And for yet additional moisture resistance, the structure includes one vapor barrier between the planar portions of an LVL core or plural spaced vapor barriers between such portions. Useful core materials and vapor barrier materials are as set forth above.

It is to be appreciated that all of the vapor barrier materials mentioned above are substantially incompressible when "integrated" with the wood structure. Further, a vapor barrier is quite thin, i.e., on the order of a few thousandths of an inch thick up to about thirty-thousandths of an inch thick or so. A barrier represents a small percentage of the aggregate thickness of the structure.

When viewed at a cut end of a composite wood structure having one or more such vapor barriers, an extremely thin vapor barrier, e.g., one which is only a few thousandths of an inch thick, is essentially visually indistinguishable from a conventional "glue line" at which two pieces of wood are glued together. On the other hand, a vapor barrier of about thirty thousandths of an inch in thickness is readily visually distinguishable from a glue line.

Further details of the invention are set forth in the following detailed description and in the drawing.

BRIEF DESCRIPTION OF THE DRAWING

FIG. 3 is a cross-section view of one embodiment of the composite wood structure taken along any of the viewing planes 3—3 of FIGS. 1 or 2.

FIG. 10 is a cross-section view of another embodiment of the composite wood structure taken from the same perspectives as FIG. 3.

FIG. 12 is a cross-section view of another embodiment of the composite wood structure taken along any of the viewing planes 3—3 of FIGS. 1 or 2. The illustrated embodiment is similar to that of FIG. 3 but is free of veneer.

FIG. 13 is a cross-section view of yet another embodiment of the composite wood structure taken along any of the viewing planes 3—3 of FIGS. 1 or 2. The illustrated embodiment is similar to that of FIG. 3 but includes veneer as both exterior layers.

DETAILED DESCRIPTION OF THE PREFERRED EMBODIMENTS

Figure 1:
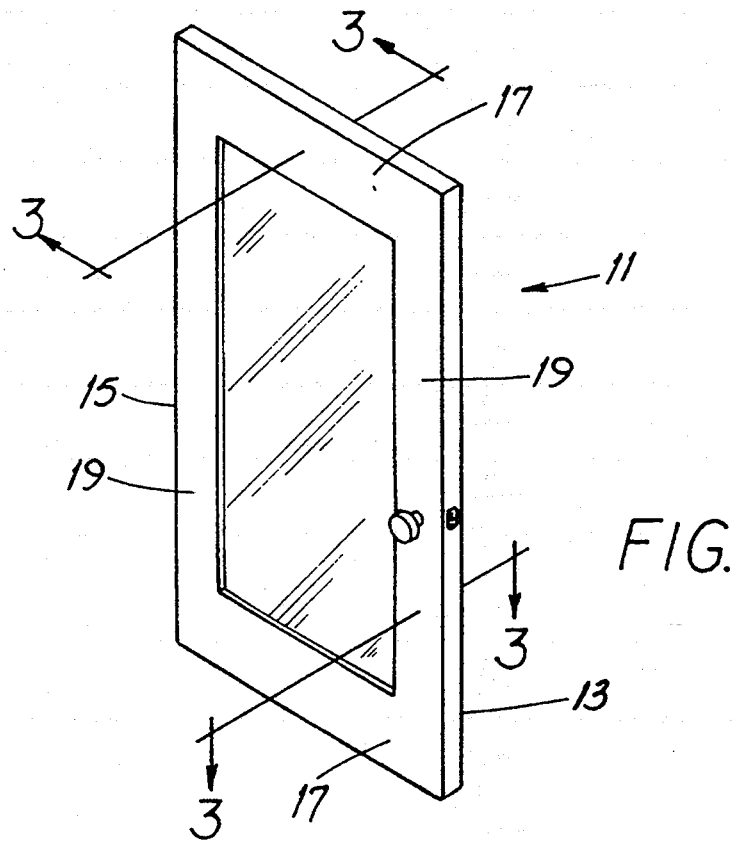
FIG. 1 is an isometric view of a door which may be made using the inventive composite wood structure.

Before describing details of the new composite wood structure 10, it will be helpful to have a basic understanding of some of the ways in which such structure 10 is used. Referring to FIG. 1, an exemplary wood door 11 has a window pane surrounded by the door frame 13. While the illustrated door 11 is of the type to be mounted by hinges along the edge 15, the new structure 10 is also useful for making so-called patio doors which roll or slide along tracks. The horizontal components 17 of the door frame 13 are known in the industry as "rails" and the vertical components 19 as "stiles."

The inventive wood structure 10 finds greatest application in so-called "weather doors," i.e., doors which have one side exposed to the outdoor ambient. In contrast, both sides of an interior door are usually subjected to closely similar conditions of temperature and humidity. Moisture is less likely to migrate through such interior doors and cause them to warp.

Figure 2:
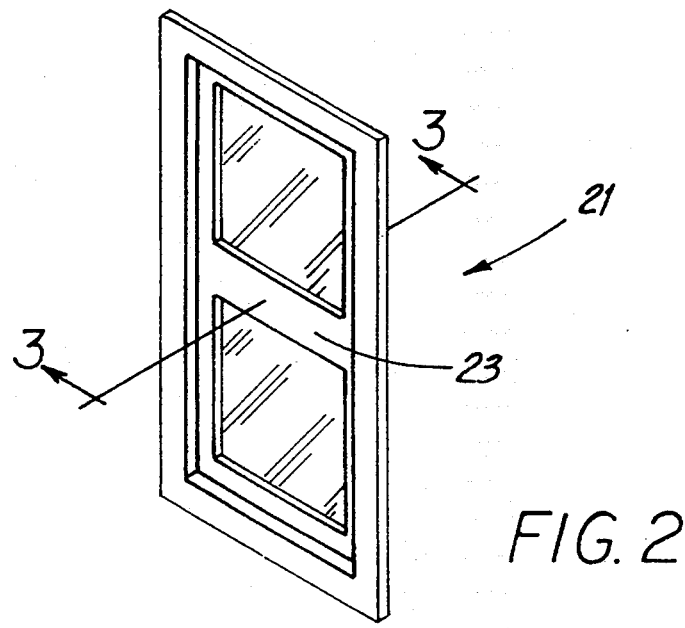
FIG. 2 is an isometric view of a window which may be made using the inventive composite wood structure.
Figure 4:
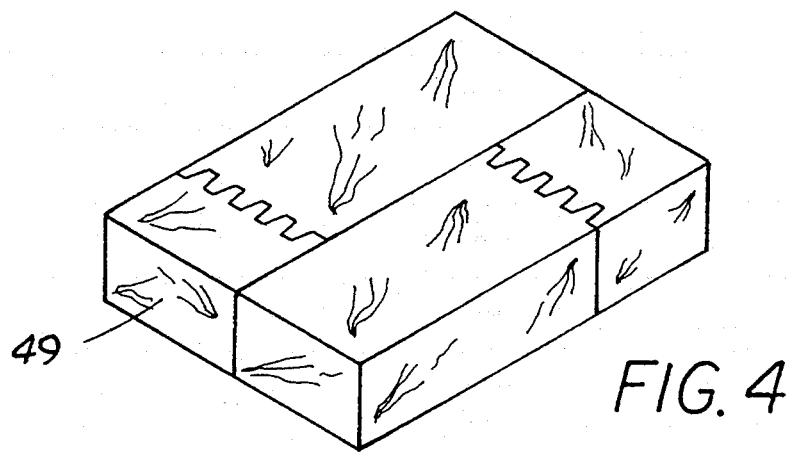
FIG. 4 is an isometric view of a piece of edge-glued finger jointed lumber.
Figure 5:
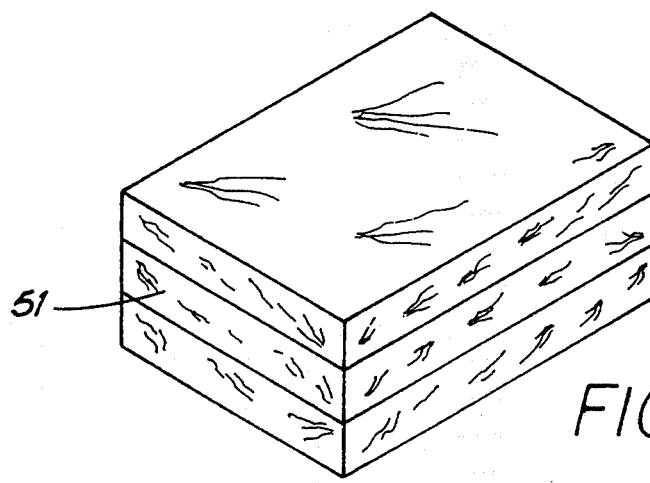
FIG. 5 is an isometric view of a piece of laminated lumber.
Figure 6:
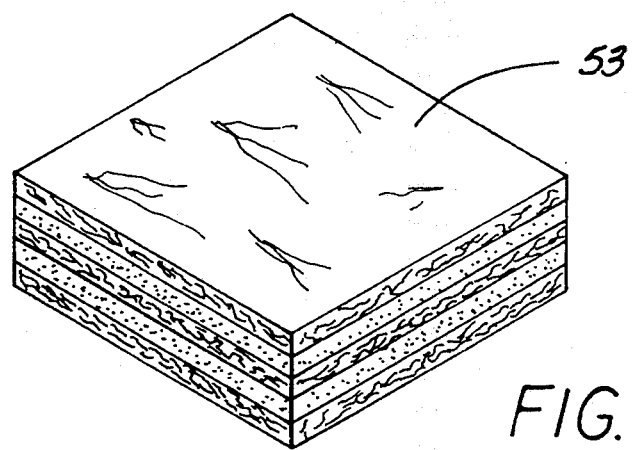
FIG. 6 is an isometric view of a piece of plywood.
Figure 7:
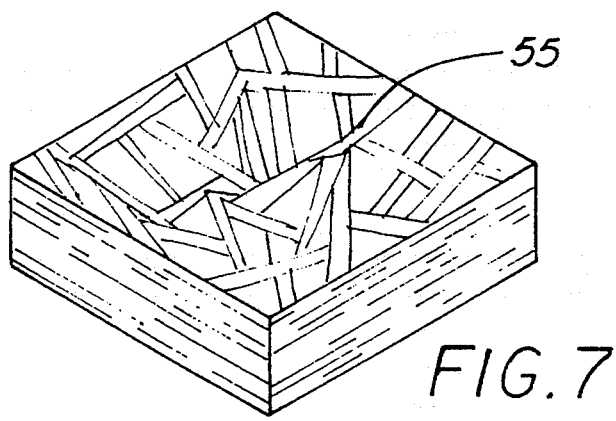
FIG. 7 is an isometric view of a piece of oriented strand board (OSB).

FIG. 2 shows an exemplary window 21 having a wood frame 23 and the new structure 10 may advantageously be used to make door rails 17 and stiles 19 and to make wood window frames 23. While the invention is described in connection with a door 11, it is to be appreciated that such description is applicable to structures 10 for making windows 21.

Referring now to FIG. 3, one example of the new composite wood structure 10 has first and second spaced layers with a core 29 interposed between the layers. The layers 25, 27 may be, for example, composite board such as high-density particle board, medium density fiberboard, hardboard or other suitable wood composite products. The layer 27a is shown as decorative veneer. The core 29 is shown as LVL but other core materials such as those described below may be used.

Depending in large part upon how the finished door 11 is to be used, the structure 10 may include one or two layers of composite board such as layers 25, 27. And if the door 11 will be installed in a home, for example, a layer 27a of decorative veneer is preferred on that side of the structure 10 which faces into the room when the door 11 is mounted.

Figure 11:
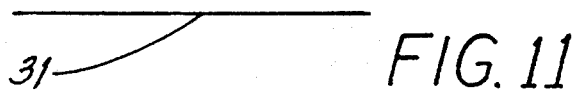
FIG. 11 is an edge view of a sheet-like vapor barrier made of any of several materials.

Referring also to FIG. 11, a sheet-like vapor barrier 31 is between the layers 25, 27 or 25, 27a and limits migration of moisture through the barrier 31. Such moisture migration is limited to less than about 6 grams of water vapor per square meter of barrier area per hour.

And in one exemplary structure 10 of FIG. 3 and having a core 29 of LVL 29a, such barrier 31 may be at any one of several locations between the layers 25, 27, 27a. For example, a barrier 31 may be between a composite board 25 or 27 and the core 29 as at location 33 or 35 or it may be between the decorative veneer 27a and the composite board 27 as at location 37. Even better resistance to moisture migration is provided with plural spaced vapor barriers 31 between the layers 25, 27, 27a. For example, one combination involves a barrier 31 at locations 34, 37 and at either (a) locations 33, 35, (b) locations 41, 44, (c) locations 45, 47, or (d) location 42. Another, somewhat less preferred combination involves a barrier 31 at either (a) locations 33, 35, (b) locations 41, 44, (c) locations 45, 47, or (d) location 42. The resulting wood structure 10 is made resistant to warping due to moisture migration. As an example, such structure 10 embodied as a piece about 4 feet long and useful to make a door rail exhibited warpage of about 0.050 inches, well within a nominal maximum of about 0.100 inches.

Figure 8:
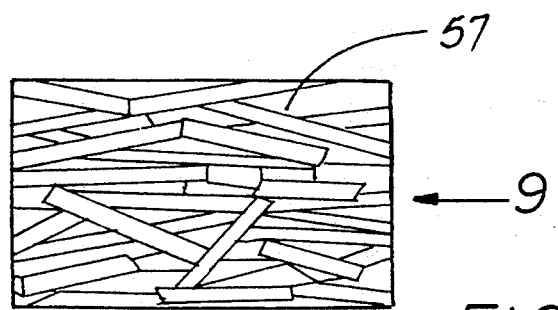
FIG. 8 is a plan view of a piece of waferboard.
Figure 9:
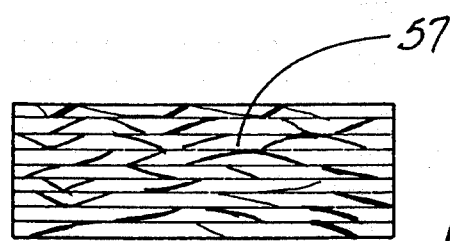
FIG. 9 is a cross-section view of the waferboard of FIG. 8 taken along the viewing axis VA9 thereof.

Referring next to FIGS. 4 through 9, while a core 29 of LVL 29a is preferred in many instances, the core 29 of the inventive structure 10 is not limited to such materials. Such core 29 may be made of a material selected from a group of core materials comprising, in addition to laminated veneer lumber 29a, edge-glued finger jointed lumber 49 (FIG. 4), laminated lumber 51 (FIG. 5), plywood 53 (FIG. 6), oriented strand board 55 (FIG. 7) and waferboard 57 (FIGS. 8 and 9). Fiberboard and particle board may also be used.

The vapor barrier 31 used in the inventive structure is made of a material selected from a group of vapor barrier materials comprising melamine formaldehyde impregnated paper or phenol formaldehyde impregnated paper, either of which is thermally fused or secondarily bonded (glued) to the substrate(s). Other suitable vapor barriers are made from thermoset materials, thermoplastic materials and aluminum foil. Examples of thermoset materials are polyester and polyurethane and examples of thermoplastic materials are polyethylene, polypropylene, polyvinylidine chloride, polyvinyl chloride and polycarbonate.

Referring next to FIG. 10, the invention may be embodied as a composite wood structure 10 including first and second spaced layers 59, 61 of veneer having first and second outer surfaces, 63, 65 respectively, and a core 29 interposed between the layers 59, 61. Most preferably, a vapor barrier 31 is at each of locations 74, 76. Vapor barriers 31 at locations 73, 75 are somewhat less preferred. In another arrangement of the structure 10, the veneer layers 59, 61 are omitted and a vapor barrier 31 is applied to each side of the core 29 of LVL 29a. To state it another way, vapor barriers 31 are used in place of the veneer layers 59, 61 in such arrangement and the outer surfaces 63, 65 are those of the vapor barriers 31. (As used in the foregoing, the phrase "outer surface" means a surface which would be exposed to view prior to application of the vapor barrier 31.)

A vapor barrier 31 having an outer surface 63 or 65 is preferably of the type to which paint can be applied and will adhere well. In that regard, the surface finish of the barrier 31 is substantially more important than the material from which the barrier 31 is made.

The structures 10 shown in FIGS. 12 and 13 are similar to that shown in FIG. 3, the latter having a single layer of veneer 27a. The structure 10 of FIG. 12 is veneer-free while the structure 10 of FIG. 13 has two layers of veneer 27a, one on each side.

In preferred embodiments of the structures 10 of FIGS. 12 and 13, there is a vapor barrier 31 at each of the locations 34, 37 and either (a) locations 33 and 35, (b) locations 41 and 44, or (c) locations 45 and 47.

As shown in FIGS. 3 and 10, the structure 10 may be "edge-banded" for aesthetic purposes. An edge-banded structure 10 has one or more relatively thin strips 77 of lumber at what will be or may be an exposed edge in the finished door 11 or window 21. The strips 77 will accept virtually all paint, stain and varnish products in common use for finishing doors 11 and windows 21 and are more pleasing to the eye than the raw edge of, say, a core 29 of LVL or plywood.

The preferred way of making the new structure 10 is by hot pressing. However, cold pressing, hot roll laminating, cold roll laminating, extruding or a combination of the foregoing may also be used.

When viewed at a cut end of a composite wood structure 10 having one or more such vapor barriers 31 (as in FIG. 3), an extremely thin vapor barrier 31, e.g., one which is only a few thousandths of an inch thick as at location 41, is essentially visually indistinguishable from a conventional "glue line" at which two pieces of wood are glued together. Such a glue line is shown at 42. On the other hand, a vapor barrier 31 of about thirty thousandths of an inch in thickness is readily visually distinguishable from a glue line 42. Such a thicker vapor barrier 31 is shown at location 47 for exemplary purposes.

While the principles of this invention have been described in connection with specific embodiments, it should be understood clearly that these descriptions are made only by way of example and are not intended to limit the scope of the invention.

What is claimed:

1. In a composite wood structure useful in making doors and windows, the structure including (a) first and second spaced layers, and (b) a core interposed between the layers, such structure having a thickness, the improvement wherein:
   the structure is substantially fiber-free and includes a sheet vapor barrier between the layers and coextensive with the layers;
   the vapor barrier is bonded and substantially free of biomass particles;
   the vapor barrier comprises less than about 20% of the thickness of the structure; and
   the vapor barrier limits migration of moisture to less than about 6 grams per square meter of barrier area per hour,
   whereby the wood structure is made resistant to warpage due to moisture migration.

2. The wood structure of claim 1 wherein:
   the layers are composite board; and
   the vapor barrier is between the composite boards and the core.

3. The wood structure of claim 2 including plural spaced vapor barriers between the layers.

4. The wood structure of claim 1 wherein:
   the core is laminated veneer lumber having a plurality of planar portions; and
   the vapor barrier is between the planar portions.

5. The wood structure of claim 3 including plural spaced vapor barriers between the planar portions.

6. The wood structure of claim 1 wherein:
   the vapor barrier is a first vapor barrier;
   the layers are composite board;
   the first layer has a veneer layer affixed thereto; and
   a second vapor barrier is between the first layer and the veneer layer.

7. The wood structure of claim 6 wherein:
   the core has a plurality of planar portions; and
   the first vapor barrier is between planar portions.

8. The wood structure of claim 1 wherein the core is made of a material selected from a group of core materials comprising (a) laminated veneer lumber, (b) edge-glued finger jointed lumber, (c) laminated lumber, (d) plywood, (e) oriented strand board, (f) waferboard, (g) fiberboard and (h) particle board.

9. The wood structure of claim 1 wherein the vapor barrier is made of a material selected from a group of vapor barrier materials comprising (a) melamine formaldehyde impregnated paper, (b) phenol formaldehyde impregnated paper, (c) thermoset materials, (d) thermoplastic materials and (e) aluminum foil.

10. A composite wood structure useful in making doors and windows, the structure having a thickness and including:
    first and second spaced layers having first and second outer surfaces, respectively; and
    an exterior vapor barrier bonded to each of the outer surfaces and coextensive with such outer surfaces;
    and wherein:
    the vapor barriers are substantially free of biomass particles;
    the vapor barriers comprise less than about 20% of the thickness of the structure;
    the structure is substantially fiber-free; and,
    the vapor barriers limit moisture migration to less than about 6 grams per square meter of surface area per hour,
    whereby the wood structure is made resistant to warpage due to moisture migration.

11. The wood structure of claim 10 including:
    a core interposed between the layers; and
    an interior vapor barrier in the core for limiting migration of moisture.

12. The wood structure of claim 11 wherein:
    the core is laminated veneer lumber having a plurality of planar portions; and
    the interior vapor barrier is between planar portions.

13. The wood structure of claim 12 wherein:
    the core includes a first pair of planar portions and a second pair of planar portions;
    the interior vapor barrier is a first interior vapor barrier and is between the first pair of planar portions; and
    the structure includes a second interior vapor barrier between the second pair of planar portions.

14. The wood structure of claim 10 wherein the first interior vapor barrier is made of a material selected from a group of vapor barrier materials comprising (a) melamine formaldehyde impregnated paper, (b) phenol formaldehyde impregnated paper, (c) thermoset materials, (d) thermoplastic materials and (e) aluminum foil.

15. The wood structure of claim 10 wherein the vapor barriers are made of material selected from a group of vapor barrier materials comprising (a) melamine formaldehyde impregnated paper, (b) phenol formaldehyde impregnated paper, (c) thermoset materials, (d) thermoplastic materials and (e) aluminum foil.

16. The wood structure of claim 10 wherein the core is made of material selected from a group of core materials comprising (a) laminated veneer lumber, (b) edge-glued finger jointed lumber, (c) laminated lumber, (d) plywood, (e) oriented strand board, (f) waferboard, (g) fiberboard, and (h) particle board.

* * * * *

UNITED STATES PATENT AND TRADEMARK OFFICE
CERTIFICATE OF CORRECTION

PATENT NO. : 5,439,749

DATED : August 8, 1995

INVENTOR(S) : Thomas A. Klasell et al.

It is certified that error appears in the above-identified patent and that said Letters Patent is hereby corrected as shown below:

On the title page, item (75), line Inventors, please delete ", both of Wis." after the word "Oconomowoc"

item (75), line Inventors, please insert --; Duane T. Fier, Hudson, all of Wis.; Jeffry A. LeClair, Eagan, Mn.-- after the word "Oconomowoc"

On column 2, line 63, please delete "drawing" and substitute therefore --drawings--

On column 4, line 28, please delete "drawing" and substitute therefore --drawings--

On column 4, line 30, please delete "DRAWING" and substitute therefore --DRAWINGS--

On column 6, line 27, please delete "barriers" and substitute therefore --barrier--

Signed and Sealed this

Ninth Day of January, 1996

*Attest:*

BRUCE LEHMAN

*Attesting Officer*     Commissioner of Patents and Trademarks